United States Patent
Kwon et al.

(10) Patent No.: US 10,211,432 B2
(45) Date of Patent: Feb. 19, 2019

(54) HOLLOW PACKAGING FOR CABLE-TYPE SECONDARY BATTERY, AND CABLE-TYPE SECONDARY BATTERY COMPRISING SAME

(71) Applicant: LG Chem, Ltd., Seoul (KR)

(72) Inventors: Yo-Han Kwon, Daejeon (KR);
Hye-Ran Jung, Daejeon (KR);
Je-Young Kim, Daejeon (KR);
Seok-Koo Kim, Daejeon (KR)

(73) Assignee: LG Chem, Ltd. (KR)

( * ) Notice: Subject to any disclaimer, the term of this patent is extended or adjusted under 35 U.S.C. 154(b) by 187 days.

(21) Appl. No.: 15/124,459

(22) PCT Filed: Jun. 19, 2015

(86) PCT No.: PCT/KR2015/006250
§ 371 (c)(1),
(2) Date: Sep. 8, 2016

(87) PCT Pub. No.: WO2015/194908
PCT Pub. Date: Dec. 23, 2015

(65) Prior Publication Data
US 2017/0025645 A1    Jan. 26, 2017

(30) Foreign Application Priority Data
Jun. 19, 2014   (KR) .................. 10-2014-0074845

(51) Int. Cl.
*H01M 2/02* (2006.01)
*H01M 2/00* (2006.01)
(Continued)

(52) U.S. Cl.
CPC .......... *H01M 2/022* (2013.01); *H01M 2/026* (2013.01); *H01M 2/028* (2013.01);
(Continued)

(58) Field of Classification Search
None
See application file for complete search history.

(56) References Cited

U.S. PATENT DOCUMENTS

2002/0164525 A1* 11/2002 Hosokawa .............. B32B 15/08
                                                    429/163
2008/0241647 A1   10/2008 Fukui et al.
(Continued)

FOREIGN PATENT DOCUMENTS

JP    2000173559 A    6/2000
JP    2001202997 A    7/2001
(Continued)

OTHER PUBLICATIONS

International Search Report from PCT/KR2015/006250, dated Sep. 15, 2015.

*Primary Examiner* — Yoshitoshi Takeuchi
(74) *Attorney, Agent, or Firm* — Lerner, David, Littenberg, Krumholz & Mentlik, LLP

(57) ABSTRACT

The present invention relates to a hollow packaging for a cable-type secondary battery and a cable-type secondary battery comprising same, and more specifically, to a hollow packaging for a cable-type secondary battery and a cable-type secondary battery comprising same, wherein the hollow packaging for a cable-type secondary battery comprises a packaging sheet including a sheet-type thin metal layer provided with a corrugated pattern on the surface, a first polymer resin layer formed on one surface of the thin metal layer, and a mechanical support layer formed on the other surface of the thin metal layer, wherein the packaging sheet forms a hollow space by bending so that the first polymer resin layer faces inward.

17 Claims, 7 Drawing Sheets

(51) Int. Cl.
*H01M 4/70* (2006.01)
*H01M 10/058* (2010.01)
*H01M 10/052* (2010.01)

(52) U.S. Cl.
CPC ....... *H01M 2/0275* (2013.01); *H01M 2/0277* (2013.01); *H01M 2/0285* (2013.01); *H01M 2/0287* (2013.01); *H01M 4/70* (2013.01); *H01M 10/052* (2013.01); *H01M 10/058* (2013.01); *H01M 2002/0297* (2013.01); *H01M 2220/30* (2013.01); *Y02T 10/7011* (2013.01)

(56) References Cited

U.S. PATENT DOCUMENTS

| | | |
|---|---|---|
| 2012/0107657 A1 | 5/2012 | Kwon et al. |
| 2013/0101884 A1* | 4/2013 | Ueda .................. H01M 10/052 429/127 |
| 2014/0178745 A1 | 6/2014 | Kwon et al. |
| 2014/0227572 A1 | 8/2014 | Kwon et al. |
| 2014/0234672 A1 | 8/2014 | Kwon et al. |

FOREIGN PATENT DOCUMENTS

| | | |
|---|---|---|
| JP | 2013543643 A | 12/2013 |
| KR | 20060027279 A | 3/2006 |
| KR | 20060037827 A | 5/2006 |
| KR | 20080088356 A | 10/2008 |
| KR | 20140028723 A | 3/2014 |
| KR | 20140047010 A | 4/2014 |
| WO | 2014077635 A1 | 5/2014 |

\* cited by examiner though it can be recharged repeatedly. A common secondary battery includes a lead accumulator, a NiCd battery, a NiMH accumulator, a Li-ion battery, and a Li-ion polymer battery. When compared to a disposable primary battery, not only is the secondary battery more economically efficient, it is also more environmentally friendly.

HOLLOW PACKAGING FOR CABLE-TYPE SECONDARY BATTERY, AND CABLE-TYPE SECONDARY BATTERY COMPRISING SAME

CROSS-REFERENCE TO RELATED APPLICATION

This application is a national phase entry under 35 U.S.C. § 371 of International Application No. PCT/KR2015/006250, filed Jun. 19, 2015, which claims priority to Korean Patent Application No. 10-2014-0074845, filed Jun. 19, 2014, the disclosures of which are incorporated herein by reference.

TECHNICAL FIELD

The present disclosure relates to a hollow packaging for a cable-type secondary battery and a cable-type secondary battery comprising the same, and more particularly, to a hollow packaging for a cable-type secondary battery in which a pattern with a corrugated structure is pre-formed on the surface of a metal foil layer included in a packaging to improve flexibility of a cable-type secondary battery and a cable-type secondary battery comprising the same.

BACKGROUND ART

A secondary battery is a device that stores electrical energy in chemical form and converts the stored chemical energy into electrical energy to generate electricity when needed. The secondary battery is also referred to as a "rechargeable battery" because it can be recharged repeatedly. A common secondary battery includes a lead accumulator, a NiCd battery, a NiMH accumulator, a Li-ion battery, and a Li-ion polymer battery. When compared to a disposable primary battery, not only is the secondary battery more economically efficient, it is also more environmentally friendly.

Secondary batteries are currently used in applications where low power is needed, for example, devices for assisting in the starting of car engines, mobile devices, tools, and uninterrupted power supply systems. Recent developments in wireless communication technologies have led to the popularization of mobile devices and have brought about a tendency to connect many types of existing devices to wireless networks. Under such circumstances, demand for secondary batteries is growing explosively. Hybrid vehicle and electric vehicle have been put into practical use in the aspect of environmental pollution prevention. These next-generation automobiles reduce costs and weight and increase their life span by employing technologies based on secondary batteries.

Generally, most secondary batteries have a cylindrical, prismatic, or pouch shape. This is because the secondary batteries are fabricated by mounting an electrode assembly composed of a negative electrode, a positive electrode and a separator in a cylindrical or prismatic metal can or a pouch-shaped case of an aluminum laminate sheet, and by injecting an electrolyte into the electrode assembly. Thus, because a predetermined mounting space for the secondary battery is required, the cylindrical, prismatic or pouch shape of the secondary battery is a limitation in developing various shapes of mobile devices. Accordingly, there is a need for a new type of secondary battery that is easily adaptable in shape.

To fulfill this need, a cable-type secondary battery having a very high ratio of length to cross-sectional diameter has been proposed. A packaging for protecting the cable-type secondary battery requires both flexibility and waterproof properties. When a general tube packaging of a polymer material is used, water or air may permeate through the micropores of the polymer and contaminate an electrolyte in a battery, causing battery performance degradation.

To overcome the problem, a packaging formed of a metal foil layer may be used, but due to a stiff property of the metal foil layer itself, in the event that a battery is bent, the battery is not completely bent, and folding or wrinkling occurs on the surface of the metal foil layer, the result being the metal foil layer tearing.

DISCLOSURE

Technical Problem

The present disclosure is directed to providing a hollow packaging for a cable-type secondary battery for preventing the contamination of an electrolyte in a cable-type secondary battery to prevent battery performance degradation as well as improving mechanical flexibility and a cable-type secondary battery comprising the same.

Technical Solution

To achieve the above object, according to an aspect of the present disclosure, there is provided a hollow packaging for a cable-type secondary battery, including a packaging sheet including a sheet-type metal foil layer having a pattern with a corrugated structure formed on a surface thereof, a first polymer resin layer formed on one surface of the metal foil layer, and a mechanical support layer formed on the other surface of the metal foil layer, wherein the packaging sheet has a hollow by bending such that the first polymer resin layer faces inward.

In this instance, the pattern with a corrugated structure may be formed in a lengthwise direction of the packaging for a cable-type secondary battery.

Further, the hollow packaging for a cable-type secondary battery may be formed by bending the packaging sheet such that one end part and the other end part of the first polymer resin layer are adhered to each other, and sealing the packaging sheet.

On the other hand, the metal foil layer may be any one selected from the group consisting of iron (Fe), carbon (C), chrome (Cr), manganese (Mn), nickel (Ni), copper (Cu), aluminum (Al) and equivalents thereof, or alloys thereof.

Further, the first polymer resin layer may be made of any one selected from the group consisting of polyolefin-based resin, polyester-based resin, polyamide-based resin and fluoro-based resin, or mixtures thereof.

Further, the first polymer resin layer may further include hydrophobic inorganic particles.

In this instance, the hydrophobic inorganic particles may be any one selected from the group consisting of $SiO_2$, $Al_2O_3$, MgO, $BaTiO_3$, $ZrO_2$ and ZnO or mixtures thereof, and the hydrophobic inorganic particles may have an average particle size of from 1 nm to 5 μm.

Further, the mechanical support layer may be formed of any one selected form the group consisting of high density polyethylene, low density polyethylene, linear low density polyethylene, ultra high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalate, or mixtures thereof.

On the other hand, the packaging sheet may further include a second polymer resin layer formed on an upper surface of the mechanical support layer.

In this instance, the hollow packaging for a cable-type secondary battery may be formed by bending the packaging sheet such that one end of the first polymer resin layer and one end part of the second polymer resin layer are adhered to each other and sealing the packaging sheet.

Further, the second polymer resin layer may be made of any one selected from the group consisting of polyolefin-based resin, polyester-based resin, polyamide-based resin and fluoro-based resin, or mixtures thereof.

On the other hand, according to another aspect of the present disclosure, there is provided a hollow packaging for a cable-type secondary battery, including a hollow metal foil layer having a pattern with a corrugated structure formed on a surface thereof, a first polymer resin layer formed on an inner surface of the metal foil layer, and a mechanical support layer formed on an outer surface of the metal foil layer.

On the other hand, according to still another aspect of the present disclosure, there is provided a cable-type secondary battery, including a hollow packaging including an electrode assembly extending in a lengthwise direction, the electrode assembly comprising: an inner current collector, an inner electrode active material layer, an outer electrode active material layer, an electrolyte layer interposed between the inner electrode active material layer and the outer electrode active material layer, and an outer current collector thin film formed outside of the outer electrode active material layer, and a hollow part into which the electrode assembly is inserted, wherein the hollow packaging is formed around and in close contact with an outer surface of the electrode assembly inserted into the hollow part, wherein the hollow packaging is the above-mentioned hollow packaging for a cable-type secondary battery of the present disclosure.

Here, the outer current collector thin film may be in half pipe or mesh shape.

Further, the outer current collector thin film may be made of stainless steel, aluminum, nickel, titanium, sintered carbon, copper; stainless steel surface-treated with carbon, nickel, titanium or silver; an aluminum-cadmium alloy; a non-conductive polymer surface-treated with a conductive material; or a conductive polymer.

Further, the inner current collector may be made of stainless steel, aluminum, nickel, titanium, sintered carbon, copper; stainless steel surface-treated with carbon, nickel, titanium or silver; an aluminum-cadmium alloy; a non-conductive polymer surface-treated with a conductive material; or a conductive polymer.

On the other hand, any one of the inner electrode active material layer and the outer electrode active material layer may include active material particles of any one selected from the group consisting of natural graphite, artificial graphite, a carbonaceous material; lithium-containing titanium composite oxide (LTO), and metals (Me) including Si, Sn, Li, Zn, Mg, Cd, Ce, Ni or Fe; alloys consisting of the metals (Me); oxides (MeOx) of the metals (Me); and composites of the metals (Me) and carbon, or mixtures thereof.

Further, any one of the inner electrode active material layer and the outer electrode active material layer may include active material particles of any one selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg and Mo, and x, y and z are each independently atomic fractions of elements in an oxide composition, in which $0<x<0.5$, $0<y<0.5$, $0<z<0.5$, $x+y+z\le1$), or mixtures thereof.

Further, the electrolyte layer may include an electrolyte selected from a gel-type polymer electrolyte using PEO, PVdF, PMMA, PAN or PVAc, and a solid electrolyte using PEO, polypropylene oxide (PPO), polyethylene imine (PEI), polyethylene sulphide (PES) or polyvinyl acetate (PVAc).

On the other hand, according to another aspect of the present disclosure, there is provided a cable-type secondary battery, including a hollow packaging including an electrode assembly extending in a lengthwise direction, the electrode assembly comprising: a lithium ion supplying core containing an electrolyte, an inner electrode comprising at least one wire-type inner current collector wound around an outer surface of the lithium ion supplying core and an inner electrode active material layer formed on a surface of the wire-shaped inner current collector, a separation layer formed around an outer surface of the inner electrode to prevent a short of the electrode, and a wound sheet-type outer electrode formed around an outer surface of the separation layer and comprising an outer current collector and an outer electrode active material layer formed on at least one surface of the outer current collector, and a hollow part into which the electrode assembly is inserted, wherein the hollow packaging is formed around and in close contact with an outer surface of the electrode assembly inserted into the hollow part, wherein the hollow packaging is the above-mentioned hollow packaging for a cable-type secondary battery of the present disclosure.

Advantageous Effects

One of the effects of the present disclosure is that inclusion of the metal foil layer can prevent the contamination of an electrolyte in a cable-type secondary battery and consequential battery performance degradation, and maintain the mechanical strength of the cable-type secondary battery.

Further, inclusion of the metal foil layer having a pattern with a corrugated structure can improve the mechanical flexibility of a cable-type secondary battery while not damaging a packaging, in the event that the cable-type secondary battery is bent.

DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

[Description of Reference Numerals]

Figure 1:
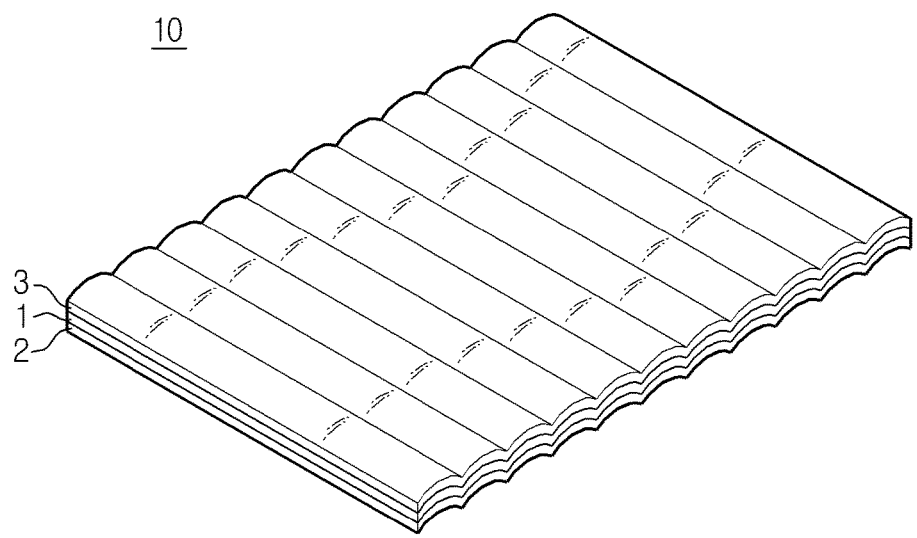
FIG. 1 is a diagram showing a packaging sheet according to an embodiment of the present disclosure.

| | |
|---|---|
| 1: Sheet-type metal foil layer | 1': Hollow metal foil layer |
| 2, 2': First polymer resin layer | 3, 3': Mechanical support layer |
| 4: Second polymer resin layer | 5: Inner current collector |
| 6: Inner electrode active material layer | |
| 7: Outer electrode active material layer | |
| 8: Electrolyte layer | 9: Outer current collector thin film |
| 10, 11: Packaging sheet | |
| 20, 21, 22: Hollow packaging for a cable-type secondary battery | |
| 30: Electrode assembly | |
| 100, 200: Cable-type secondary battery | |
| 210: lithium ion supplying core | |
| 220: Wire-type inner current collector | |
| 230: Inner electrode active material layer | |
| 240: Separation layer | |
| 250: Outer current collector | |
| 260: Outer electrode active material layer | |

MODE FOR CARRYING OUT THE INVENTION

Hereinafter, the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Further, the embodiments described in the specification and illustrations shown in the drawings are just one most preferred example of the present disclosure, not intended to represent all the technical aspects of the present disclosure, so it should be understood that alternatives, other equivalents and modifications would be made thereto at the time the present application is filed.

Figure 2:
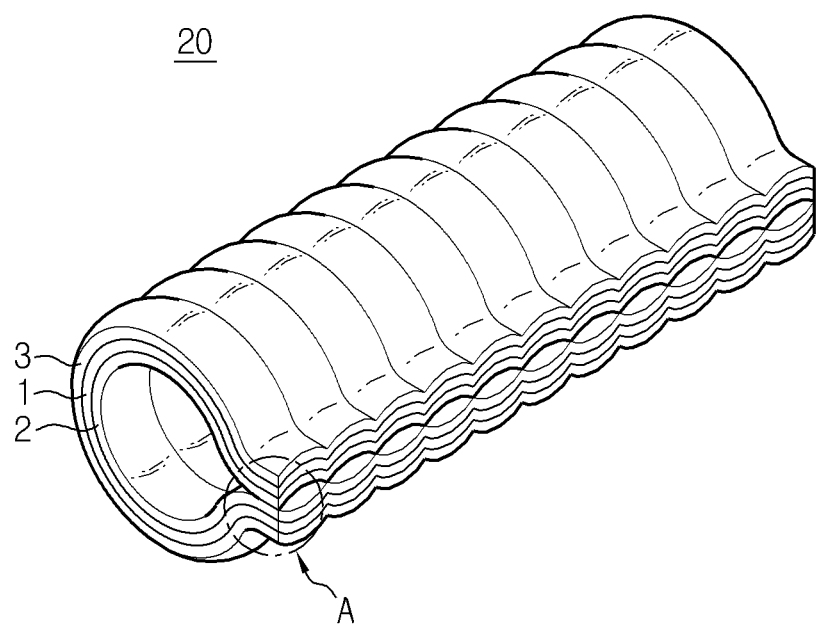
FIG. 2 is a diagram showing a hollow packaging for a cable-type secondary battery according to an embodiment of the present disclosure.
Figure 3:
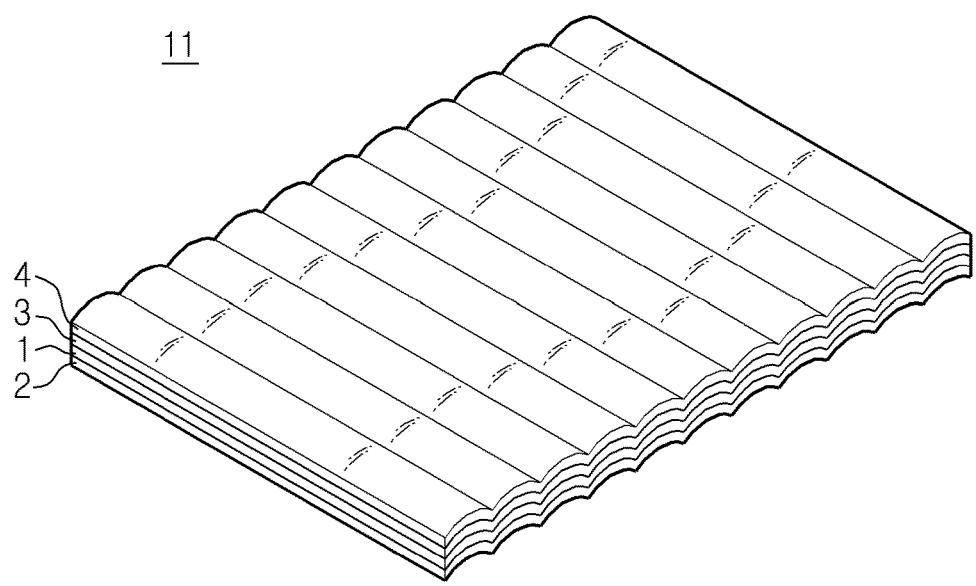
FIG. 3 is a diagram showing a packaging sheet according to another embodiment of the present disclosure.
Figure 4:
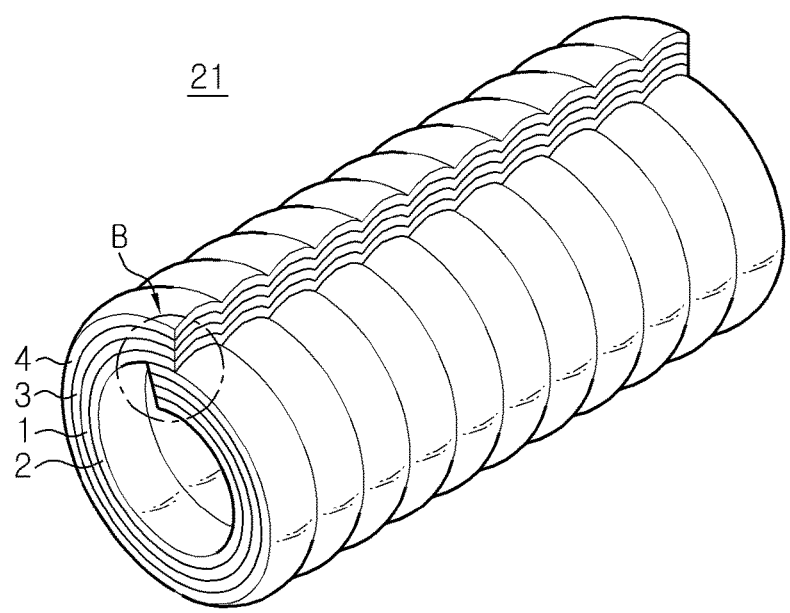
FIG. 4 is a diagram showing a hollow packaging for a cable-type secondary battery according to another embodiment of the present disclosure.

FIGS. 1 and 3 are diagrams showing a packaging sheet according to an embodiment of the present disclosure, and FIGS. 2 and 4 are diagrams showing a hollow packaging for a cable-type secondary battery according to an embodiment of the present disclosure.

Referring to FIGS. 1 and 2, a hollow packaging 20 for a cable-type secondary battery according to an aspect of the present disclosure includes a packaging sheet 10 including a sheet-type metal foil layer 1 having a pattern with a corrugated structure formed on the surface thereof; a first polymer resin layer 2 formed on one surface of the metal foil layer 1; and a mechanical support layer 3 formed on the other surface of the metal foil layer 1, wherein the packaging sheet has a hollow by bending such that the first polymer resin layer 2 faces inward.

When a general tube packaging of a polymer material is used, water or air may permeate through the micropores of the polymer and contaminate an electrolyte in a battery, causing battery performance degradation, while the packaging 20 for a cable-type secondary battery includes the metal foil layer 1 inside to keep water or air from penetrating into the battery. Accordingly, contamination of an electrolyte in the battery can be prevented, and battery performance degradation can be prevented. Further, the mechanical strength of the cable-type secondary battery can be maintained.

Also, as the metal foil layer having a pattern with a corrugated structure is included, in the event that the cable-type secondary battery is bent, the mechanical flexibility of the cable-type secondary battery can be improved while not damaging the packaging.

In this instance, the pattern with a corrugated structure may be formed in the lengthwise direction of the packaging 20 for a cable-type secondary battery as shown in FIG. 2, and accordingly, in the event that the cable-type secondary battery is bent, damage of the packaging can be prevented.

Also, as shown in FIG. 2, the hollow packaging 20 for a cable-type secondary battery may be formed by bending the packaging sheet 10 such that one end part and the other end part of the first polymer resin layer 2 are adhered to each other as shown in section A and sealing it.

Here, the metal foil layer 1 may be any one selected from the group consisting of iron (Fe), carbon (C), chrome (Cr), manganese (Mn), nickel (Ni), copper (Cu), aluminum (Al) and equivalents thereof, or alloys thereof. The metal foil layer 1 is not limited to the exemplary group, but when an iron containing material is used for the metal foil layer 1, the mechanical strength increases, and when an aluminum containing material is used, flexibility improves. Preferably, an aluminum metal foil may be used.

Also, the first polymer resin layer 2 may be made of any one selected from the group consisting of polyolefin-based resin, polyester-based resin, polyamide-based resin and fluoro-based resin, or mixtures thereof.

Also, the first polymer resin layer 2 may act as heat shrink tube layer. The heat shrink tube is a tube that shrinks when heated, and tightly wraps terminals or materials of different shapes or sizes, and generally, the heat shrink tube is made of a polymer resin and is used for insulating or other applications. As heat shrink tubes having various materials and shapes are commercially available, a suitable heat shrink tube for the object of the present disclosure can be easily obtained and used. In this instance, low shrink processing temperature is necessary to avoid damaging the secondary battery thermally, and generally, it is required to finish shrinking at the temperature of from 70 to 200 or from 70 to 120. The heat shrink tube layer may be made of any one selected from the group consisting of polyolefin-based resin such as polyethylene and polypropylene, polyester-based resin such as polyethyleneterephthalate, and fluoro-based resin such as polyvinylidenefluoride and polytetrafluoroethylene, or mixtures thereof.

Also, the first polymer resin layer 2 may further include hydrophobic inorganic particles. Examples of the hydrophobic inorganic particles include, but are not limited to, $SiO_2$, $Al_2O_3$, $MgO$, $BaTiO_3$, $ZrO_2$ and $ZnO$. Also, the hydrophobic inorganic particles may have an average particle size of from 1 nm to 5 μm. As the hydrophobic inorganic particles are further included, an insulating effect in the battery can be further improved, water permeation into the battery is prevented and contamination of an electrolyte substance in the battery is minimized, thereby preventing the battery performance degradation.

On the other hand, the mechanical support layer 3 may be formed of any one selected from the group consisting of high density polyethylene, low density polyethylene, linear low density polyethylene, ultra high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalate, or mixtures thereof.

On the other hand, referring to FIGS. 3 and 4, the packaging sheet 11 may further include a second polymer resin layer 4 formed on the upper surface of the mechanical support layer 3.

In this instance, the hollow packaging 21 for a cable-type secondary battery may be formed by bending the packaging sheet 11 such that one end part of the first polymer resin layer 2 and one end part of the second polymer resin layer 4 are adhered to each other as shown in section B and sealing it.

Here, the second polymer resin layer 4 may be made of any one selected from the group consisting of polyolefin-based resin, polyester-based resin, polyamide-based resin and fluoro-based resin, or mixtures thereof.

In this instance, the second polymer resin layer 4 may act as a heat shrink tube layer in the same way as the first polymer resin layer 2, and its example is the same as mentioned above. Also, the second polymer resin layer 4 may further include hydrophobic inorganic particles in the same way as the first polymer resin layer 2.

Figure 5:
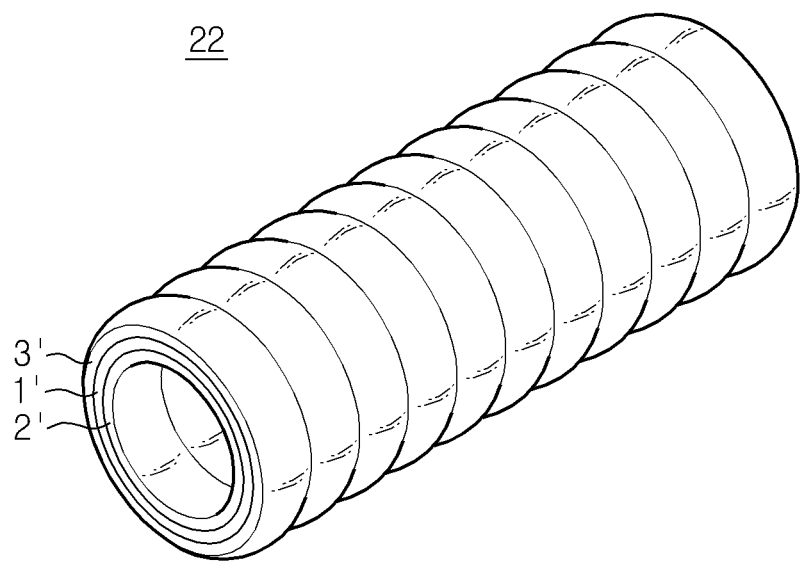
FIG. 5 is a diagram showing a hollow packaging for a cable-type secondary battery according to still another embodiment of the present disclosure.

On the other hand, FIG. 5 is a diagram showing a hollow packaging for a cable-type secondary battery according to still another embodiment of the present disclosure. Referring to FIG. 5, the hollow packaging 22 for a cable-type secondary battery according to an aspect of the present disclosure includes a hollow metal foil layer 1' having a pattern with a corrugated structure formed on the surface thereof; a first polymer resin layer 2' formed on the inner surface of the metal foil layer 1'; and a mechanical support layer 3' formed on the outer surface of the metal foil layer P. Accordingly, an effect produced by including the hollow metal foil layer 1' having the pattern with a corrugated structure on the surface is the same as mentioned above.

Figure 6:
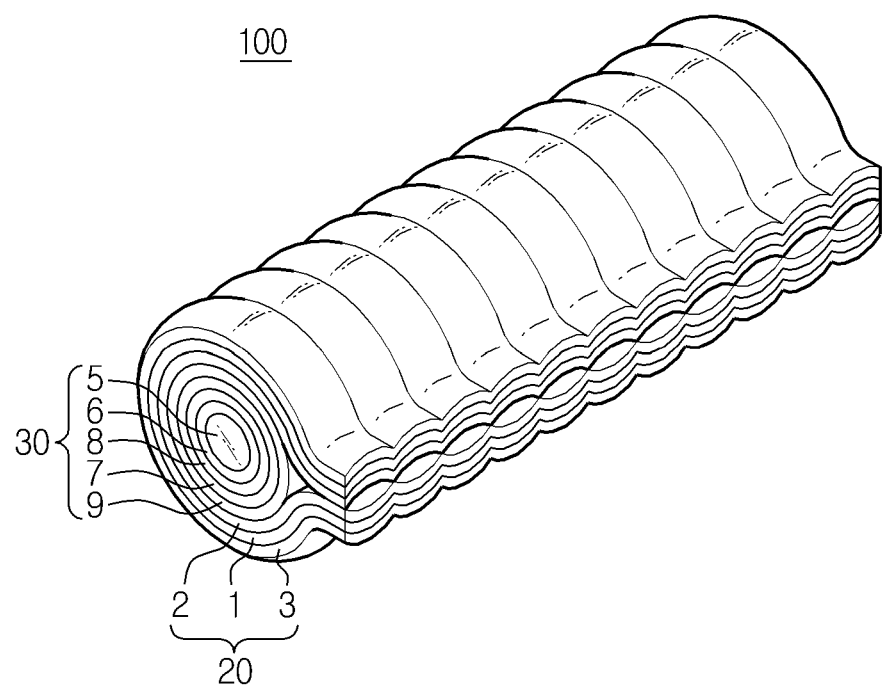
FIG. 6 is a diagram showing a cable-type secondary battery according to an embodiment of the present disclosure.
Figure 7:
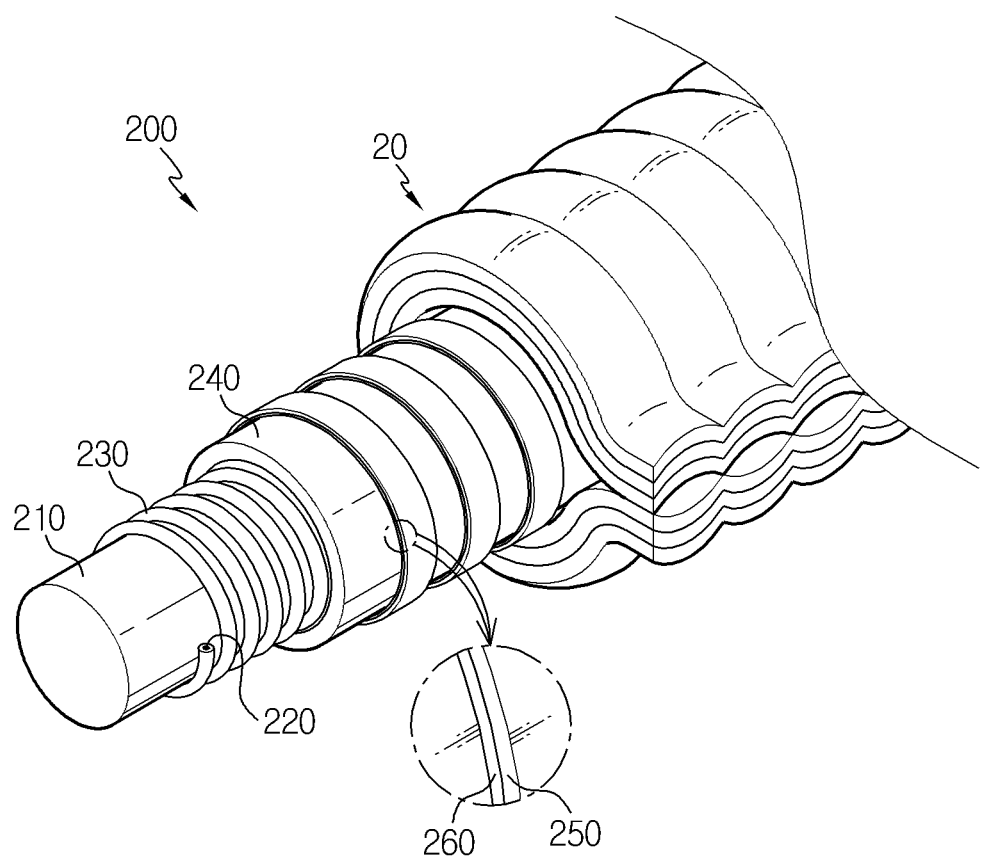
FIG. 7 is a diagram showing a cable-type secondary battery according to another embodiment of the present disclosure.

On the other hand, FIG. 6 is a diagram showing a cable-type secondary battery according to an embodiment of the present disclosure, and FIG. 7 is a diagram showing a cable-type secondary battery according to another embodiment of the present disclosure.

Referring to FIG. 6, a cable-type secondary battery 100 according to an aspect of the present disclosure includes a hollow packaging including an electrode assembly 30 extending in the lengthwise direction and a hollow part into which the electrode assembly 30 is inserted, the electrode assembly 30 including an inner current collector 5, an inner electrode active material layer 6, an outer electrode active material layer 7, an electrolyte layer 8 interposed between the inner electrode active material layer 6 and the outer electrode active material layer 7, and an outer current collector thin film 9 formed outside of the outer electrode active material layer 7, wherein the hollow packaging is formed around and in close contact with the outer surface of the electrode assembly inserted into the hollow part, and the hollow packaging is the above-mentioned hollow packaging 20 for a cable-type secondary battery of the present disclosure.

In this instance, the electrode assembly 30 may have a cross section in a predetermined shape, and the predetermined shape is not limited to a particular shape and may include any shape that does not damage the nature of the present disclosure. More specifically, the cross section may be in a circular shape or a polygonal shape, the circular shape may have a circular structure of geometrically perfect symmetry and an asymmetrical oval structure, and non-limiting examples of the polygonal structure include a triangle, a square, a pentagon, or a hexagon. The cable-type secondary battery 100 of the present disclosure has a cross section in a predetermined shape, and has a linear structure elongating in a longitudinal direction with regard to the cross section as well as flexibility, so it can freely change in shape.

Here, a half pipe-shaped or mesh-shaped current collector or a metal paste coating layer may be used for the outer current collector thin film 9.

When the half pipe-shaped current collector is used, two or three may be adhered to the packaging 20 and used to fully wrap the outer surface of the electrode assembly. However, in this instance, they are arranged at a regular interval, taking heat shrink of the tube into account.

When the mesh-shaped current collector is used, elasticity is achieved to some extent, so it may be tailored and used to fully wrap the outer surface of the electrode assembly.

Also, when the metal paste is used, it may be coated on the inner surface of the packaging 20.

In this instance, the inner current collector 5 or the outer current collector thin film 9 may be each independently made using stainless steel, aluminum, nickel, titanium, sintered carbon, copper; stainless steel surface-treated with carbon, nickel, titanium or silver; an aluminum-cadmium alloy; a non-conductive polymer surface-treated with a conductive material; or a conductive polymer, and is not particularly limited thereto. The conductive material may include polyacetylene, polyaniline, polypyrrole, polythiophene, polysulfurnitride, indium tin oxide (ITO), copper, silver, palladium and nickel, and the conductive polymer may include polyacetylene, polyaniline, polypyrrole, polythiophene and polysulfurnitride.

Here, the inner electrode and the outer electrode may be respectively a negative electrode and a positive electrode, or a positive electrode and a negative electrode.

When the inner electrode or the outer electrode is used as a negative electrode, the active material layer may include natural graphite, artificial graphite, a carbonaceous material; lithium-containing titanium composite oxide (LTO), and metals (Me) including Si, Sn, Li, Zn, Mg, Cd, Ce, Ni or Fe; alloys consisting of the metals (Me); oxides (MeOx) of the metals (Me); and composites of the metals (Me) and carbon.

Also, when the inner electrode or the outer electrode is used as a positive electrode, the active material layer may include $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg and Mo, and x, y and z are each independently atomic fractions of elements in an oxide composition, in which $0<x<0.5$, $0<y<0.5$, $0<z<0.5$, $x+y+z\leq1$).

Also, the electrolyte layer 8 may include a gel-type polymer electrolyte using PEO, PVdF, PMMA, PAN or PVAc; and a solid electrolyte using PEO, polypropylene oxide (PPO), polyethylene imine (PEI), polyethylene sulphide (PES) or polyvinyl acetate (PVAc). The matrix of the solid electrolyte preferably comprises a polymer or a ceramic glass as the backbone. In the case of typical polymer electrolytes, ions move very slowly in terms of a reaction rate, even when the ionic conductivity is satisfied. Thus, using the gel-type polymer electrolyte which facilitates the movement of ions is preferable to using the solid electrolyte. The gel-type polymer electrolyte has poor mechanical properties and thus may include a porous support or a crosslinked polymer to improve the poor mechanical properties. The electrolyte layer of the present disclosure can serve as a separator, and thus the use of a separate separator may be eliminated.

Also, the electrolyte layer 8 may further include a lithium salt. The lithium salt may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate and lithium tetraphenylborate.

Further, referring to FIG. 7, a cable-type secondary battery 200 according to another aspect of the present disclosure includes a hollow packaging including an electrode assembly extending in the lengthwise direction and a hollow part into which the electrode assembly is inserted, the electrode assembly including a lithium ion supplying core 210 containing an electrolyte, an inner electrode including at least one wire-type inner current collector 220 wound around the outer surface of the lithium ion supplying core 210 and an inner electrode active material layer 230 formed on the surface of the wire-shaped inner current collector 220, a separation layer 240 formed around the outer surface of the inner electrode to prevent a short of the electrode, and a wound sheet-type outer electrode formed around the outer surface of the separation layer 240 and including an outer current collector 250 and an outer electrode active material layer 260 formed on at least one surface of the outer current collector 250, wherein the hollow packaging is formed around and in close contact with the outer surface of the electrode assembly inserted into the hollow part, and the hollow packaging is the above-mentioned hollow packaging 20 for a cable-type secondary battery of the present disclosure.

In this instance, the lithium ion supplying core 210 contains an electrolyte, and the electrolyte is not limited to a particular type and may include a nonaqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methylacetate (MA), or methylpropionate (MP); a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc). The electrolyte may further include a lithium salt, and the lithium salt preferably includes LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate and lithium tetraphenylborate. The lithium ion supplying core 210 may consist only of an electrolyte, and a liquid electrolyte solution may be formed using a porous carrier.

For the separation layer 240 of the present disclosure, an electrolyte layer or a separator may be used. The electrolyte layer which acts as an ion channel may include a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc). The matrix of the solid electrolyte preferably comprises a polymer or a ceramic glass as the backbone. In the case of typical polymer electrolytes, ions move very slowly in terms of a reaction rate, even when the ionic conductivity is satisfied. Thus, using the gel-type polymer electrolyte which facilitates the movement of ions is preferable to using the solid electrolyte.

The gel-type polymer electrolyte has poor mechanical properties and thus may include a porous support or a crosslinked polymer to improve the poor mechanical properties. The electrolyte layer of the present disclosure can serve as a separator, and thus the use of a separate separator may be eliminated.

The electrolyte layer of the present disclosure may further include a lithium salt. The lithium salt can improve the ionic conductivity and reaction rate, and its non-limiting example includes LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate and lithium tetraphenylborate.

The separator is not limited to a particular type, but may include a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer. Particularly, in order for the lithium ions from the lithium ion supplying core to be easily transferred to the outer electrode, it is preferable to use a non-woven fabric separator corresponding to a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes.

On the other hand, the embodiments disclosed in the specification and the drawings just present a particular example to assist the understanding, but are not intended to limit the scope of the present disclosure. It is obvious to those skilled in the art that variations based on the technical aspects of the present disclosure other than the disclosed embodiments may be made.

What is claimed is:

1. A hollow packaging for a cable-type secondary battery, comprising:
    a packaging sheet comprising:
        a sheet-type metal foil layer having a pattern with a corrugated structure formed on a surface thereof;
        a first polymer resin layer formed on one surface of the metal foil layer;
        a mechanical support layer formed on the other surface of the metal foil layer; and
        a second polymer resin layer formed on an upper surface of the mechanical support layer,
    wherein the packaging sheet has a hollow by bending such that the first polymer resin layer faces inward,
        wherein the hollow packaging for a cable-type secondary battery is formed by bending the packaging sheet such that one end of the first polymer resin layer and one end of the second polymer resin layer are adhered to each other and sealing the packaging sheet.

2. The hollow packaging for a cable-type secondary battery according to claim 1, wherein the pattern with a corrugated structure is formed in a lengthwise direction of the packaging for a cable-type secondary battery.

3. The hollow packaging for a cable-type secondary battery according to claim 1, wherein the metal foil layer is any one selected from the group consisting of iron (Fe), carbon (C), chrome (Cr), manganese (Mn), nickel (Ni), copper (Cu), aluminum (Al) and equivalents thereof, or alloys thereof.

4. The hollow packaging for a cable-type secondary battery according to claim 1, wherein the first polymer resin layer is made of any one selected from the group consisting of polyolefin-based resin, polyester-based resin, polyamide-based resin and fluoro-based resin, or mixtures thereof.

5. The hollow packaging for a cable-type secondary battery according to claim 1, wherein the first polymer resin layer further comprises hydrophobic inorganic particles.

6. The hollow packaging for a cable-type secondary battery according to claim 5, wherein the hydrophobic inorganic particles are any one selected from the group consisting of $SiO_2$, $Al_2O_3$, MgO, $BaTiO_3$, $ZrO_2$ and ZnO or mixtures thereof.

7. The hollow packaging for a cable-type secondary battery according to claim 5, wherein the hydrophobic inorganic particles have an average particle size of from 1 nm to 5 µm.

8. The hollow packaging for a cable-type secondary battery according to claim 1, wherein the mechanical support layer is formed of any one selected form the group consisting of high density polyethylene, low density polyethylene, linear low density polyethylene, ultra high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalate, or mixtures thereof.

9. The hollow packaging for a cable-type secondary battery according to claim 1, wherein the second polymer resin layer is made of any one selected from the group consisting of polyolefin-based resin, polyester-based resin, polyamide-based resin and fluoro-based resin, or mixtures thereof.

10. A cable-type secondary battery, comprising:
a hollow packaging comprising:
    an electrode assembly extending in a lengthwise direction, the electrode assembly comprising: an inner current collector, an inner electrode active material layer, an outer electrode active material layer, an electrolyte layer interposed between the inner electrode active material layer and the outer electrode active material layer, and an outer current collector thin film formed outside of the outer electrode active material layer; and
    a hollow part into which the electrode assembly is inserted, wherein the hollow packaging is formed around and in close contact with an outer surface of the electrode assembly inserted into the hollow part,
    wherein the hollow packaging is the hollow packaging for a cable-type secondary battery defined in claim 1.

11. The cable-type secondary battery according to claim 10, wherein the outer current collector thin film is in half pipe or mesh shape.

12. The cable-type secondary battery according to claim 10, wherein the outer current collector thin film is made of stainless steel, aluminum, nickel, titanium, sintered carbon, copper; stainless steel surface-treated with carbon, nickel, titanium or silver; an aluminum-cadmium alloy; a non-conductive polymer surface-treated with a conductive material; or a conductive polymer.

13. The cable-type secondary battery according to claim 10, wherein the inner current collector is made of stainless steel, aluminum, nickel, titanium, sintered carbon, copper; stainless steel surface-treated with carbon, nickel, titanium or silver; an aluminum-cadmium alloy; a non-conductive polymer surface-treated with a conductive material; or a conductive polymer.

14. The cable-type secondary battery according to claim 10, wherein any one of the inner electrode active material layer and the outer electrode active material layer comprises active material particles of any one selected from the group consisting of natural graphite, artificial graphite, a carbonaceous material; lithium-containing titanium composite oxide (LTO), and metals (Me) including Si, Sn, Li, Zn, Mg, Cd, Ce, Ni or Fe; alloys consisting of the metals (Me); oxides (MeOx) of the metals (Me); and composites of the metals (Me) and carbon, or mixtures thereof.

15. The cable-type secondary battery according to claim 10, wherein any one of the inner electrode active material layer and the outer electrode active material layer comprises active material particles of any one selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg and Mo, and x, y and z are each independently atomic fractions of elements in an oxide composition, in which $0<x<0.5$, $0<y<0.5$, $0<z<0.5$, $x+y+z≤1$), or mixtures thereof.

16. The cable-type secondary battery according to claim 10, wherein the electrolyte layer comprises an electrolyte selected from:
    a gel-type polymer electrolyte using PEO, PVdF, PMMA, PAN or PVAc; and
    a solid electrolyte using PEO, polypropylene oxide (PPO), polyethylene imine (PEI), polyethylene sulphide (PES) or polyvinyl acetate (PVAc).

17. A cable-type secondary battery, comprising:
a hollow packaging comprising:
    an electrode assembly extending in a lengthwise direction, the electrode assembly comprising: a lithium ion supplying core containing an electrolyte, an inner electrode comprising at least one wire-type inner current collector wound around an outer surface of the lithium ion supplying core and an inner electrode active material layer formed on a surface of the wire-shaped inner current collector, a separation layer formed around an outer surface of the inner electrode to prevent a short of the electrode, and a wound sheet-type outer electrode formed around an outer surface of the separation layer and comprising an outer current collector and an outer electrode active material layer formed on at least one surface of the outer current collector, and
    a hollow part into which the electrode assembly is inserted, wherein the hollow packaging is formed around and in close contact with an outer surface of the electrode assembly inserted into the hollow part,
    wherein the hollow packaging is the hollow packaging for a cable-type secondary battery defined in claim 1.

* * * * *